United States Patent [19]

Lippincott

[11] Patent Number: 6,076,297
[45] Date of Patent: Jun. 20, 2000

[54] ENVIRONMENTALLY SAFE WEIGHTING ATTACHMENT FOR A FISHING LINE

[76] Inventor: Robert Lippincott, 5 Independence Way, Princeton, N.J. 08540

[21] Appl. No.: 08/653,714

[22] Filed: May 28, 1996

[51] Int. Cl.⁷ .................................................. A01K 95/00
[52] U.S. Cl. ........................................ 43/44.87; 43/44.91
[58] Field of Search ............................... 43/44.87, 44.91, 43/44.92, 44.95

[56] References Cited

U.S. PATENT DOCUMENTS

| | | | |
|---|---|---|---|
| 3,273,278 | 9/1966 | Lynch | 43/44.87 |
| 4,279,092 | 7/1981 | Hutson | 43/44.91 |
| 5,351,434 | 10/1994 | Krenn | 43/44.91 |
| 5,457,909 | 10/1995 | Graves | 43/44.91 |

*Primary Examiner*—Eileen P. Morgan
*Assistant Examiner*—Anthony Ojini
*Attorney, Agent, or Firm*—Norman St Landau

[57] ABSTRACT

A fishing line weight comprising a natural weight and an elastomer, all of which are devoid of any environmentally harmful substances such as lead. In one embodiment, the weight has a hole through its body which serves to hold the elastomer which after passing through the hole is fixed to the weight by nodules at each end upon which loops are attached to the fishing line. In an alternative embodiment, a groove is circumscribed around the weight with an elastomeric band placed within the groove.

4 Claims, 11 Drawing Sheets

ENVIRONMENTALLY SAFE WEIGHTING ATTACHMENT FOR A FISHING LINE

BACKGROUND OF THE INVENTION

1. Field of the Invention

This invention relates to a weight attachable to a fishing line. The weight comprises a weighted body which comprises a longitudinal hole therethrough or a circumferential groove there around or a longitudinal channel therein. A first elastomer, having at least one attachment means such as a loop, is disposed within the longitudinal hole. The loop functions to securely attach the weighted body to the fishing line. A second elastomer, having at least one attachment means such as a loop, is disposed within the circumferential groove. A third elastomer, having an elastomer groove, is disposed within the longitudinal channel. The elastomer groove functions to guide the fishing line and frictionally holed it therein.

2. Description of the Prior Art

Fishing weights which are removably attachable to a fishing line are well known in the art. Fisherman utilize different weights depending on the type of fishing and the environmental conditions at the time of fishing. For example, in fishing in rapidly moving currents, a heavier weight is utilized but the amount of weight utilized is directly proportional to the amount of insensitivity a fisherman has in determining if a fish is eating his bait. Therefore, when fishing in tidal waters it is desirable to have a fishing weight which is easily changeable in weight depending upon the current which is relative to the tide. At slack tide, the water is almost stagnant and it is desirable for the fisherman to utilize a lesser weight. At mid-tide, the current is moving maximally and it desirable for the fisherman to utilize a more weight. The present invention permits the fisherman to easily attach and detach different weights to his fishing line in response to fishing conditions.

In U.S. Pat. No. 3,982,350, Titled, Fishing Line Weight, by inventor, Heckathorn, describes a device for attaching a stone or rock to a fishing line. The patented invention differs from the present invention because it has a protuberance (18) and a flange member (24) which is lacking in the present invention. The present invention specifically claims a naturally occurring stone as part of the invention. The stone is altered to include either a cylindrical hole extending through the diameter of the stone or a groove circumscribing the periphery of the stone. A flexible band as consisting of rubber or some other elastomeric material is inserted into the groove circumscribing the stone, thereby securing the band to the stone. In the Heckathorn patent, an elastic strap is meant to secure any rock encircled within, strictly by means of elastic friction. Clearly, the present invention, containing a groove within the stone, utilizes a more secure means of attaching an elastic band to a stone. The Heckathorn patent is inferior for use as a sinker weight, since the stone is much more likely to become dislodged, before the stone sinks to the desired depth. The present invention is better adapted for use as a sinker weight, since the groove in the stone is much more likely to retain the flexible band, thereby allowing the stone to sink to the desired depth. As previously noted, the Heckathorn patent, utilizes an elastic strap relying strictly on means of elastic friction to secure any rock encircled within. Clearly, the present invention, containing a groove within the stone, utilizes a more secure means of attaching an elastic band to a stone. During casting, the Heckathorn patent is likelier to result in dislodging of the rock, thereby resulting in serious injury to the fisherman or to passersby, caused by rocks acting as uncontrolled projectiles. However, the present invention incorporates a grooved system which represents a safety enhancement to the public and serves their best interests.

An additional embodiment of the present invention includes a cylindrical hole extending through the diameter of the stone. A flexible strand as consisting of rubber or some other elastomeric material is inserted into the hole within the stone. The strand is attached to the stone by means of top and bottom nodules which secure the flexible strand in place. However, the Heckathorn patent, relies on an elastic strap meant to secure any rock encircled within, strictly by means of elastic friction. Clearly, the present invention, containing a hole within the stone, utilizes a more secure means of attaching an elastic strand to the stone. The Heckathorn patent is inferior for use as a sinker weight, since the stone is much more likely to become dislodged, before the stone sinks to the desired depth. The present invention is better adapted for use as a sinker weight, since the hole in the stone in addition to the nodules on the strand, are more likely to retain the flexible strand, thereby allowing the stone to sink to the desired depth. As previously noted, the Heckathorn patent, utilizes an elastic strap relying strictly on means of elastic friction to secure any rock encircled within. Clearly, the present invention, containing a hole within the stone in addition to the nodules on the strand, utilizes a more secure means of attaching an elastic strand to a stone. During casting, the Heckathorn patent is likelier to result in dislodging of the rock, thereby resulting in serious injury to the fisherman or to passersby, caused by rocks acting as uncontrolled projectiles. However, the present invention incorporates a hole and nodule system which represents a safety enhancement to the public and serves their best interests. The Heckathorn patent relies on the immediate availability of rocks with which to attach to the strap. However, the present invention provides for the rock being pre-attached to the band or strand. Therefore the present invention is easier to use and therefore provides increased utility for the average consumer. Therefore, the present invention is more likely to be adopted by the general public because of its greater overall In Danish Patent No. 14776 a concrete sinker with a preformed hole therein is disclosed which differs from the present invention because it has a fluted hole whereas the present invention has a cylindrical hole bored therethrough.

In Norwegian Patent No. 15840 a weight is described which contains a hole therethrough. In 1983 French Patent No. 2520973 a colorless elongated glass weight is described with a longitudinal hole in the center. The patented inventions lack an elastomer as described and claimed in the present invention.

In 1989 German Patent No. 3728581 suggested a pebble weight of purely organic material with a hole therein adapted to retain a U-shaped loop of rigid wire which lacks an elastomer as described and claimed in the present invention In French patent, 855,584 describes a fishing weight having grooves. The present invention specifically claims a stone acting as a weight which is altered to include either a cylindrical hole extending through the diameter of the stone or a groove circumscribing the periphery of the stone. An attachment means is attached to the stone either by utilizing a hole or in an alternative embodiment, a groove. The France 855,584 patent provides for a groove on the surface of a float, not a weight as in the present invention. However the France 855,584 patent does not provide for attachment by means of a cylindrical hole extending through the diameter of the float. Consequently, the present invention provides an alternative means of attachment which the France 855,584 patent does not. As such the consumer is provided with a wider selection of fishing weights from which to choose from.

In U.S. Pat. No. 5,054,227, titled, LOOSENER, by inventor Lin, a device which permits automatic release of a plummet or sinker is described. The Lin patent teaches a detachable plummet, and as such differs from the concept of the Lippincott invention in that the present invention is meant to securely hold the weight and is designed as such, not with detachability in mind. In order to comply with the objective of being detachable, the Lin patent does not teach a second nodule or loops.

In U.S. Pat. No. 2,884,735, titled, LEADER WITH RELEASABLE SINKER, by inventor C. D. Ticer, a sinker having a flexible element whereby the sinker may be detachably and releasably connected thereto is described. The Ticer teaches a releasable sinker whereby a flexible loop is used to secure a weighted object within. The Ticer patent, utilizes a flexible loop relying strictly on means of elastic friction to secure any stone or other weighted object encircled within. Clearly, the present invention, containing a hole within the stone in addition to the nodules on the strand, utilizes a more secure means of attaching an elastic strand to a stone. During casting, the Ticer patent is likelier to result in dislodging of the stone or other weighted object encircled within, thereby resulting in serious injury to the fisherman or to passersby, caused by weighted objects acting as uncontrolled projectiles. However, the present invention incorporates a hole and nodule system as well as a loop and groove system, which represents a safety enhancement to the public and serves their best interests.

U.S. Pat. No. 2,687,592, titled, CASTING APPARATUS, by inventor Purcell, teaches a casting apparatus whereby a rope is used to secure a stone within. The Purcell patent, utilizes a flexible loop relying strictly on means of elastic friction to secure a stone within. Clearly, the present invention, containing a hole within the stone in addition to the nodules on the strand, or containing an elastic band attached to a groove, utilizes a more secure means of attaching an elastic strand to a stone. During casting, the Purcell patent is likelier to result in dislodging of the stone encircled within, thereby resulting in serious injury to the fisherman or to passersby, caused by the stone acting as an uncontrolled projectile. However, the present invention incorporates a hole and nodule system as well as a loop and groove system, which represents a safety enhancement to the public and serves their best interests.

U.S. Pat. No. 5,435,095, titled, AUTOMATICALLY DETACHABLE CASTING WEIGHT, by inventor, Crumrine, teaches a bored rigid split shot sinker. A split shot sinker has the disadvantage of attaching to the line directly and being difficult to remove once attached. Additionally, the stainless steel used to manufacture the sinkers, does not provide the environmental benefit which is provided by use of stones. Consequently, the present invention is more environmentally friendly, and thus more likely to be adopted for use by the public.

U.S. Pat. No. 3,426,469 issued to Lee et al. in 1969, suggested a weight carrier for casting a fishing line with a stone, which carrier has an abutment and a water soluble element yieldingly urged against the abutment by a pin. The carrier and the pin form a loop which receives a line carrying a weight. Upon dissolution of the water soluble element, the line for the weight is released whereby the weight is released. The weight is detached from the fishhook or lure almost immediately after the fishhook or lure falls into the water, whereby the fishhook or lure can rise to the surface or adjacent thereto almost immediately after it falls into the water. Weight releasing means for a fish line as characterized above which is capable of utilizing scrap materials, such as nuts, bolt pieces of stone or concrete or the like, whereby the loss upon release of the weight is substantially insignificant. The patented invention differs from the present invention because it is simply a releasible means rather than an attachment means for a sinker as described and claimed in the present invention.

In 1967 U.S. Pat. No. 3,346,986 issued to Tiikkainen for a weight retaining attachment for a fishing line comprising a plurality of relatively short flexible strands disposed to naturally form an enclosure when separate having integrally secured ends whereby a self removable weight is carried for casting a fishing line. The patented invention differs from the present invention because it is simply a cradling means to release a weight upon casting rather than an attachment means for a sinker as described and claimed in the present invention.

Numerous innovations for fishing weights have been provided in the prior art that are adapted to be used. Even though these innovations may be suitable for the specific individual purposes to which they address, they would not be suitable for the purposes of the present invention as heretofore described.

SUMMARY OF THE INVENTION

This invention relates to a weight attachable to a fishing line. The weight comprises a weighted body which comprises a longitudinal hole therethrough or a circumferential groove there around or a longitudinal channel therein. A first elastomer, having at least one attachment means such as a loop, is disposed within the longitudinal hole. The loop functions to securely attach the weighted body to the fishing line. A second elastomer, having at least one attachment means such as a loop, is disposed within the circumferential groove. A third elastomer, having an elastomer groove, is disposed within the longitudinal channel. The elastomer groove functions to guide the fishing line and frictionally holed it therein.

This invention relates to a weight attachable to a fishing line, comprising a flexible strand made of rubber or an elastomeric substance disposed in a slot or other equivalent retaining means formed in a natural stone of granite, quartzite, limestone, sandstone, shale or the like; the strand having at least one integrally appended loop or attaching means whereby a removable weight is carried for attachment to a fishing line for casting.

The invention is an environmentally safe fishing weight made of naturally occurring stone and rubber or an elastomer. A pebble made of stone is adapted as a fishing weight by either a hole formed therein or a groove or slot circumscribed about the periphery of the pebble. Either the slot or the hole engages and retains a flexible band altered with knots tied at each end after the flexible band is stretchably extended in the slot and around the pebble. One of the knots forms a secondary loop which is used to attach the pebble to a fishing line.

A primary object of the invention is to provide a fishing weight that is not capable of chemically contaminating natural water resources or poisoning wild life.

A secondary object of the invention is to provide a fishing weight which can be manufactured in a very cost effective manner using easily available items such as rubber or elastomer bands and rocks.

Another object of the invention is to provide a kit containing a variety of grooved and drilled stones and rubber or elastomer bands whereby the user can select the desired weight and incorporate it using the flexible bands and tools provided to insert a flexible band through a hole in the stone.

BRIEF LIST OF REFERENCE NUMERALS UTILIZED IN THE DRAWING

Common Components to All Embodiments

18—fishing line (18)

First Elastomer

116—first elastomer (116)
116A—first elastomer top nodule (116A)
116B—first elastomer bottom nodule (116B)
116C—first elastomer middle (116C)
116D—first elastomer loop (116D)

Second Elastomer

216—second elastomer (216)
216A—second elastomer top nodule (216A)
216B—second elastomer bottom nodule (216B)
216C—second elastomer middle (216C)
216DA—second elastomer top loop (216DA)
216DB—second elastomer bottom loop (216DB)

Third Elastomer

316—third elastomer (316)
316A—third elastomer top nodule (316A)
316B—third elastomer band (316B)
316C—third elastomer loop (316C)

Forth Elastomer

416—forth elastomer (416)
416A—forth elastomer top nodule (416A)
416B—forth elastomer bottom nodule (416B)
416C—forth elastomer band (416C)
416CA—forth elastomer top loop (416CA)
416CB—forth elastomer bottom loop (416CB)

Fifth Elastomer

516—fifth elastomer (516)
516A—fifth elastomer top nodule (516A)
516B—fifth elastomer bottom nodule (516B)
516C—fifth elastomer band (516C)
516D—fifth elastomer groove (516D)

Sixth Elastomer

616—sixth elastomer (616)
616A—sixth elastomer left side (616A)
616B—sixth elastomer right side (616B)
616C—sixth elastomer groove (616C)

First Embodiment

110—first environmentally safe fishing weight (110)
112—first holed weight (112)
114—first hole (114)

Second Embodiment

210—second environmentally safe fishing weight (210)
212—second grooved weight (212)
214—second groove (214)

Third Embodiment

310—third environmentally safe fishing weight (310)
312—third holed weight (312)
314—third hole (314)

Forth Embodiment

410—forth environmentally safe fishing weight (410)
412—forth grooved weight (412)
414—forth groove (414)

Fifth Embodiment

510—fifth environmentally safe fishing weight (510)
512—fifth weight (512)
514—fifth channel (514)

DETAILED DESCRIPTION OF THE PREFERRED EMBODIMENT

Figure 1:
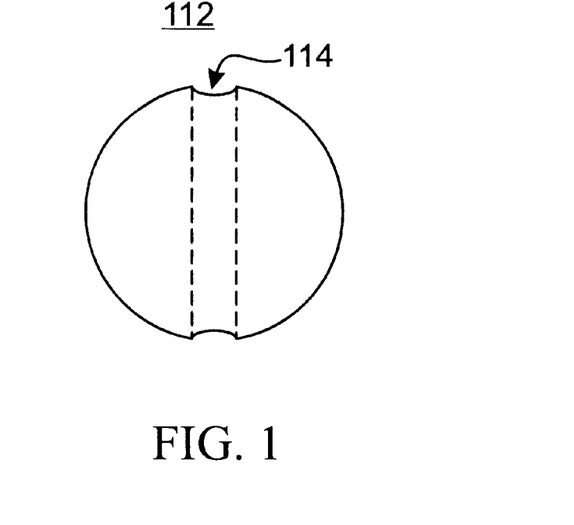
FIG. 1 is a side view of a first holed weight (112) exhibiting a first hole (114) bored therethrough.
Figure 2:
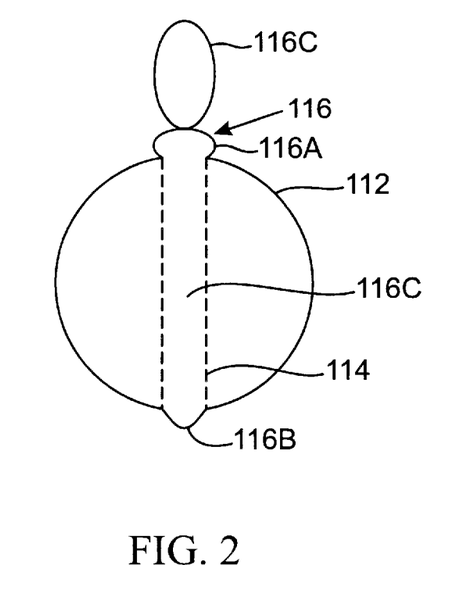
FIG. 2 is a side view of a first holed weight (112) exhibiting a first elastomer (116) contained within the first hole (114).
Figure 3:
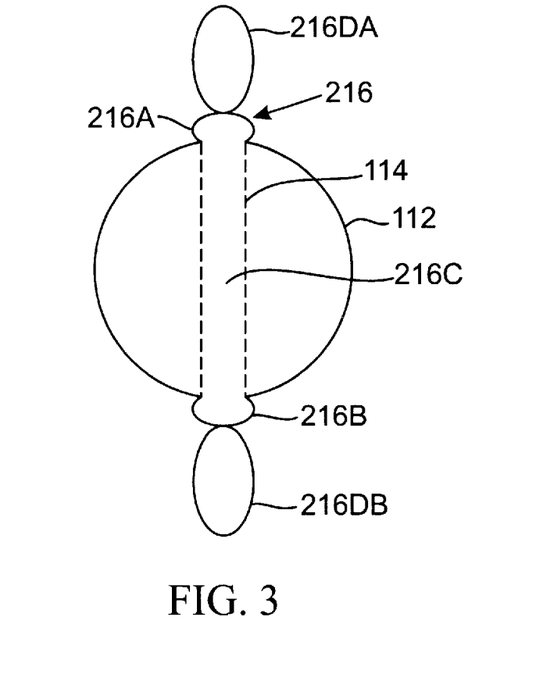
FIG. 3 is a side view of a first holed weight (112) exhibiting a second elastomer (216) contained within the first hole (114).
Figure 13:
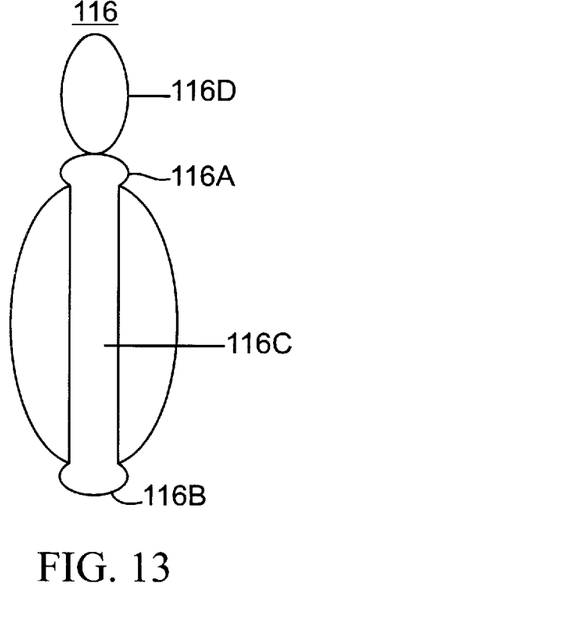
FIG. 13 is a side view of a first elastomer (116).
Figure 14:
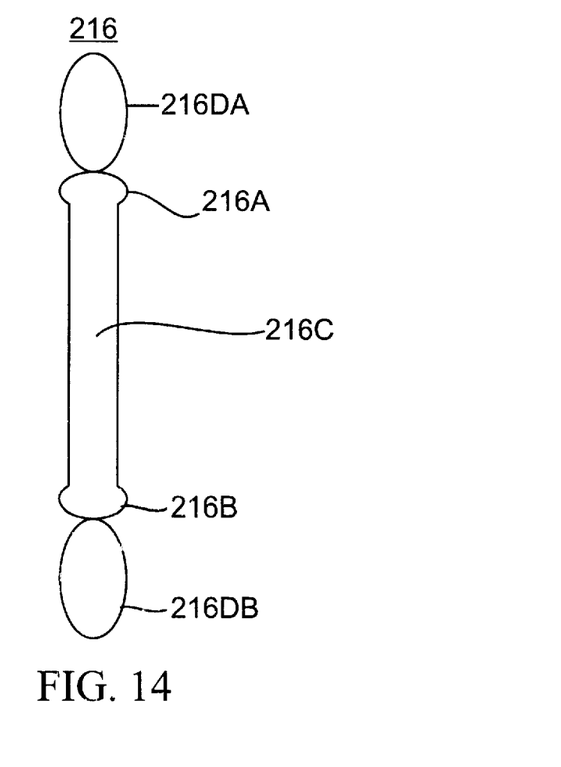
FIG. 14 is a side view of a second elastomer (216).

Firstly, referring to FIG. 1 which is a side view of a first holed weight (112) exhibiting a first hole (114) bored therethrough, FIG. 2 which is a side view of a first holed weight (112) exhibiting a first elastomer (116) contained within the first hole (114), FIG. 3 which is a side view of a first holed weight (112) exhibiting a second elastomer (216) contained within the first hole (114), FIG. 13 which is a side view of a first elastomer (116), and FIG. 14 which is side view of a second elastomer (216). The first elastomer (116) comprises a first elastomer top nodule (116A) connected to a first elastomer bottom nodule (116B) having a first elastomer middle (116C) therebetween. A first elastomer loop (116D) which functions as a fishing line (18) attachment means is securely fastened to the first elastomer top nodule (116A). The first elastomer top nodule (116A) and the first elastomer bottom nodule (116B) function to prevent accidental release of the weight from the first elastomer (116).

The second elastomer (216) comprises a second elastomer top nodule (216A) connected to a second elastomer bottom nodule (216B) having a second elastomer middle (216C) therebetween. A second elastomer top loop (216DA), which functions as a fishing line (18) attachment means, is securely attached to the second elastomer top nodule (216A) and a second elastomer bottom loop (216DB), which functions as a fishing line (18) attachment means, is securely attached to the second elastomer bottom nodule (216B). The second elastomer top nodule (216A) and the second elastomer bottom loop (216DB) function to prevent accidental release of the weight from the second elastomer (216).

Figure 4:
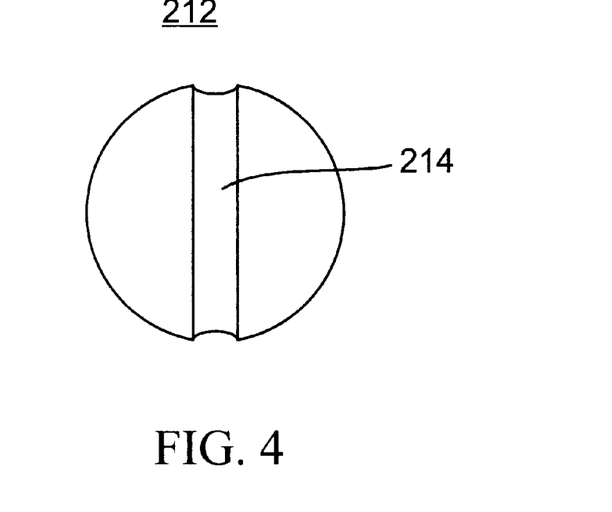
FIG. 4 is a side view of a second grooved weight (212) exhibiting a second groove (214).
Figure 5:
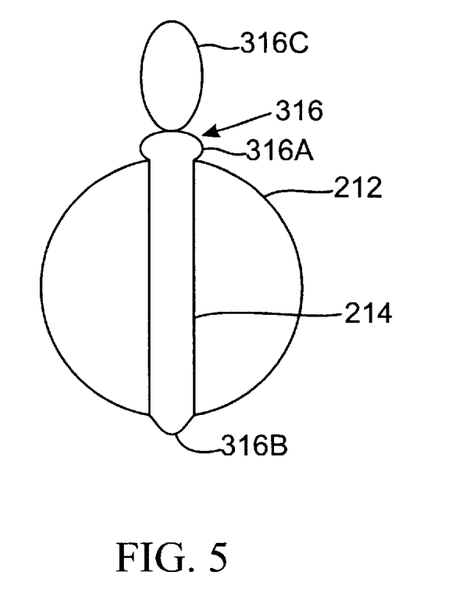
FIG. 5 is a side view of a second grooved weight (212) exhibiting a third elastomer (316) within the second groove (214).
Figure 6:
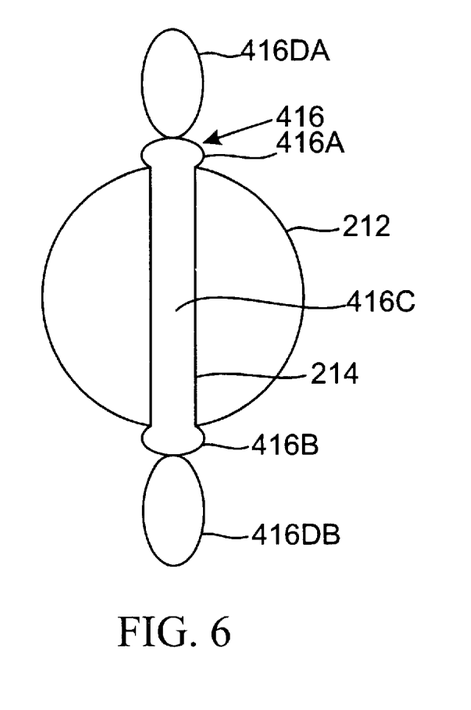
FIG. 6 is a side view of a second grooved weight (212) exhibiting a forth elastomer (416) within the second groove (214).
Figure 15:
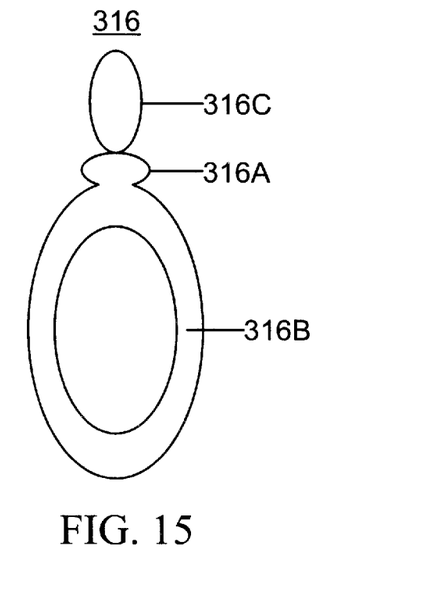
FIG. 15 is a front view of a third elastomer (316).
Figure 16:
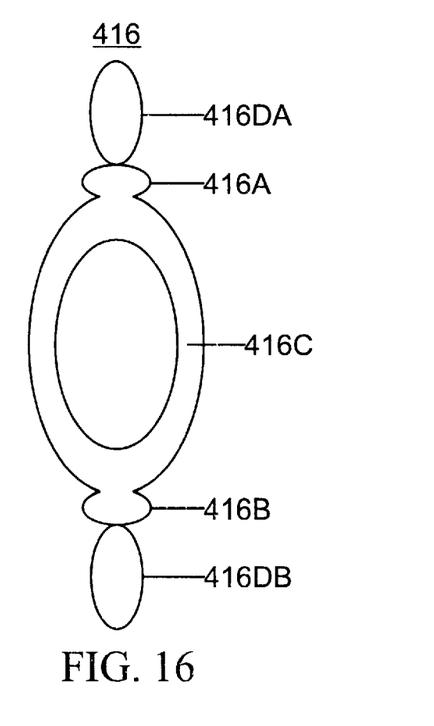
FIG. 16 is a front view of a forth elastomer (416).

Referring to FIG. 4 which is a side view of a second grooved weight (212) exhibiting a second groove (214), FIG. 5 which is a side view of a second grooved weight (212) exhibiting a third elastomer (316) within the second groove (214), FIG. 6 which is a side view of a second grooved weight (212) exhibiting a forth elastomer (416) within the second groove (214), FIG. 15 which is a front view of a third elastomer (316), and FIG. 16 which is a front view of a forth elastomer (416). The third elastomer (316) comprises a third elastomer top nodule (316A) having a third elastomer band (316B) attached thereto. A third elastomer loop (316C), which functions as a fishing line (18) attachment means, is securely fastened to the third elastomer top nodule (316A). The third elastomer band (316B) is complimentary in shape to the second groove (214) having a slightly lesser diameter than the diameter of the second grooved weight (212) which functions to secure holding means.

The forth elastomer (416) comprises a forth elastomer top nodule (416A) connected to a forth elastomer bottom nodule (416B) by a pair of forth elastomer bands (416C). A forth elastomer top loop (416CA), which functions as a fishing line (18) attachment means, is securely connected to the forth elastomer top nodule (416A) and a forth elastomer bottom loop (416CB), which functions as a fishing line (18) attachment means, is securely connected to a forth elastomer bottom nodule (416B). The forth elastomer bands (416C) are complimentary in shape to the second groove (214) having a slightly lesser diameter than the diameter of the second grooved weight (212) which functions to secure holding means.

Figure 7:
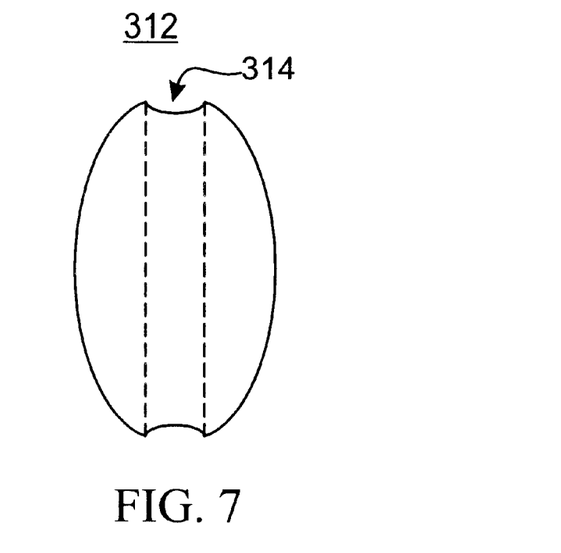
FIG. 7 is a side view of a third holed weight (312) exhibiting a third hole (314) bored therethrough.
Figure 8:
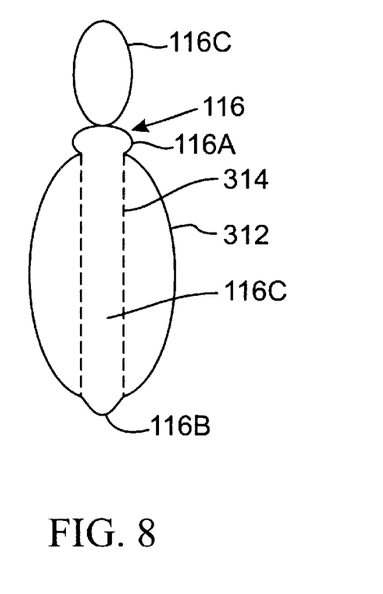
FIG. 8 is a side view of a third holed weight (312) exhibiting a first elastomer (116) contained within the third hole (314).
Figure 9:
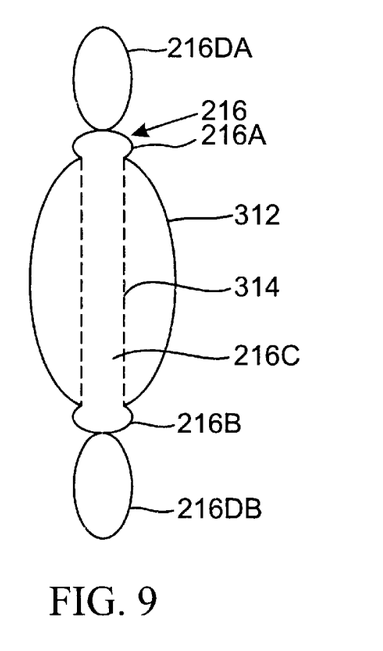
FIG. 9 is a side view of a third holed weight (312) exhibiting a second elastomer (216) contained within the third hole (314).

Now referring to FIG. 7 which is a side view of a third holed weight (312) exhibiting a third hole (314) bored therethrough, FIG. 8 which is a side view of a third holed weight (312) exhibiting a first elastomer (116) contained within the third hole (314), and FIG. 9 which is a side view of a third holed weight (312) exhibiting a second elastomer (216) contained within the third hole (314). The shape of the third holed weight (312) is double tapered cylindrical which functions to lessen aerodynamic drag when casting. The third elastomer (316) comprises a third elastomer top nodule (316A) having a third elastomer band (316B) attached thereto. A third elastomer loop (316C), which functions as a fishing line (18) attachment means, is securely fastened to the third elastomer top nodule (316A). The third elastomer band (316B) is complimentary in shape to the second groove (214) having a slightly lesser diameter than the diameter of the second grooved weight (212) which functions to secure holding means.

Figure 10:
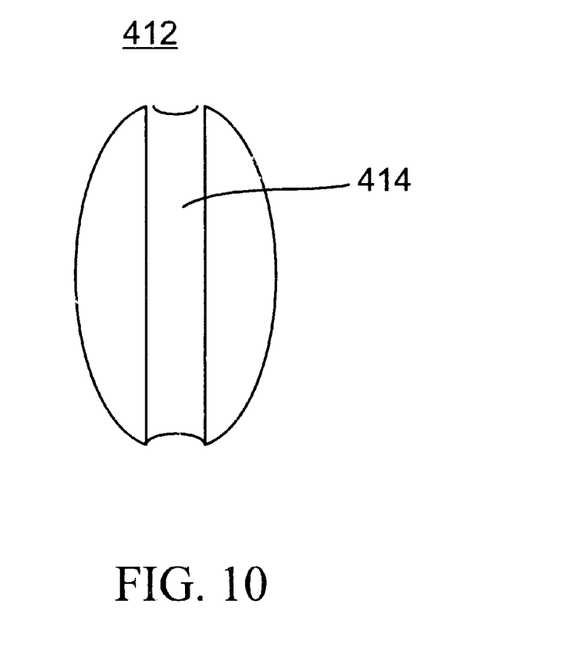
FIG. 10 is a side view of a forth grooved weight (412) exhibiting a forth groove (414).
Figure 11:
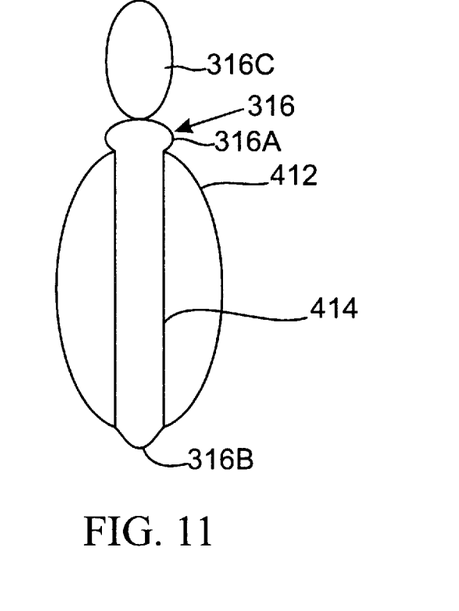
FIG. 11 is a side view of a forth grooved weight (412) exhibiting a third elastomer (316) contained within the forth groove (414).
Figure 12:
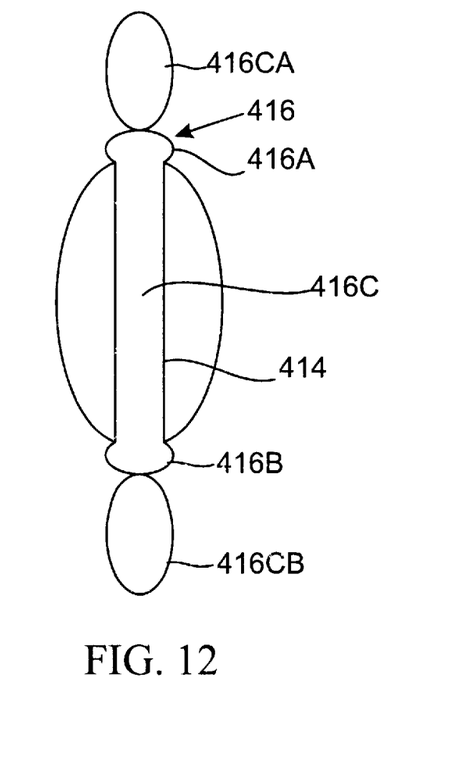
FIG. 12 is a side view of a forth grooved weight (412) exhibiting a forth elastomer (416) contained within the forth groove (414).

Referring to FIG. 10 which is a side view of a forth grooved weight (412) exhibiting a forth groove (414), FIG. 11 which is a side view of a forth grooved weight (412) exhibiting a third elastomer (316) contained within the forth groove (414), and FIG. 12 which is a side view of a forth grooved weight (412) exhibiting a forth elastomer (416) contained within the forth groove (414). The forth elastomer (416) comprises a forth elastomer top nodule (416A) connected to a forth elastomer bottom nodule (416B) by a pair of forth elastomer bands (416C). A forth elastomer top loop (416CA), which functions as a fishing line (18) attachment means, is securely connected to the forth elastomer top nodule (416A) and a forth elastomer bottom loop (416CB), which functions as a fishing line (18) attachment means, is securely connected to a forth elastomer bottom nodule (416B). The forth elastomer bands (416C) are complimentary in shape to the forth groove (414) having a slightly lesser diameter than the diameter of the forth grooved weight (412) which functions to secure holding means.

Figure 17:
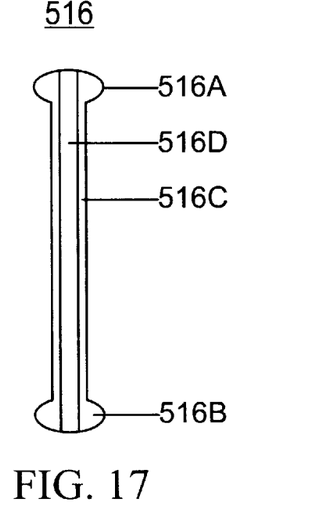
FIG. 17 is a side view of a fifth elastomer (516).
Figure 17A:
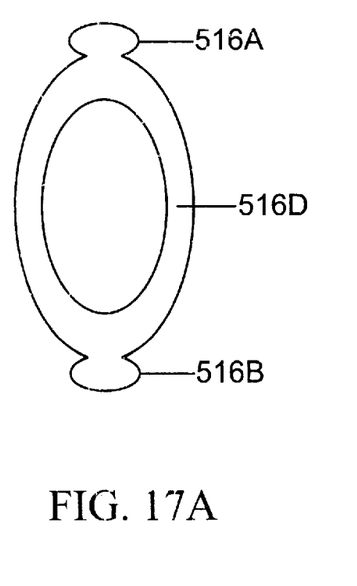
FIG. 17A is a front view of a fifth elastomer (516).
Figure 18:
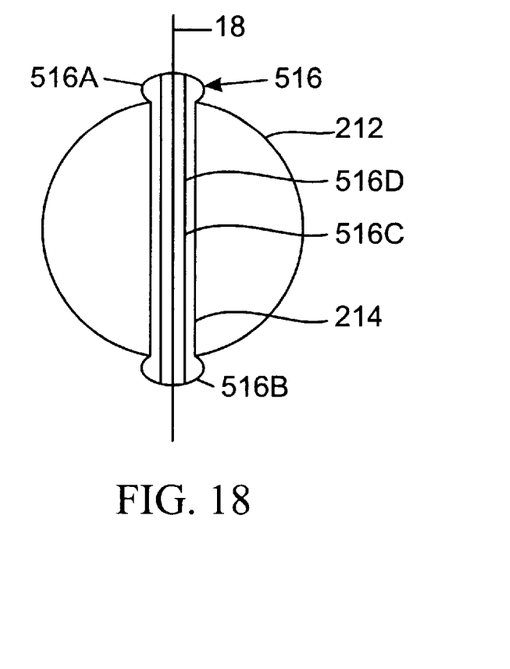
FIG. 18 is a side view of a second grooved weight (212), attached to a fishing line (18), having a fifth elastomer (516) contained within the second groove (214).
Figure 18A:
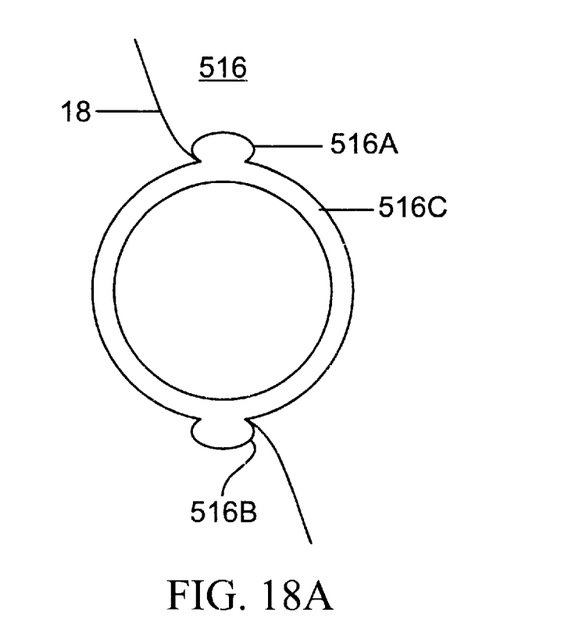
FIG. 18A is a front view of a second grooved weight (212), attached to a fishing line (18), having a fifth elastomer (516) contained within the second groove (214).

Referring to FIG. 17 which is a side view of a fifth elastomer (516), FIG. 17A which is a front view of a fifth elastomer (516), FIG. 18 which is a side view of a second grooved weight (212), attached to a fishing line (18), having a fifth elastomer (516) contained within the second groove (214), and FIG. 18A which is a front view of a second grooved weight (212), attached to a fishing line (18), having a fifth elastomer (516) contained within the second groove (214).

The fifth elastomer (516), having a circumferential fifth elastomer groove (516D) which functions as a fishing line holding means (18), comprises a fifth elastomer top nodule (516A) connected to a fifth elastomer bottom nodule (516B) by a pair of fifth elastomer bands (516C). The fifth elastomer bands (516C) are complimentary in shape to the second groove (214) having a slightly lesser diameter than the diameter of the second grooved weight (212) which functions to secure holding means.

Figure 19:
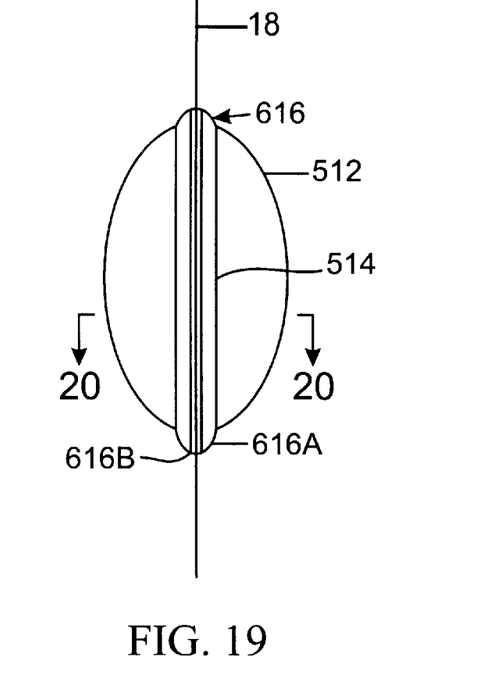
FIG. 19 is a side view of a fifth weight (512), attached to a fishing line (18), having a sixth elastomer (616) contained within the fifth channel (514).
Figure 19A:
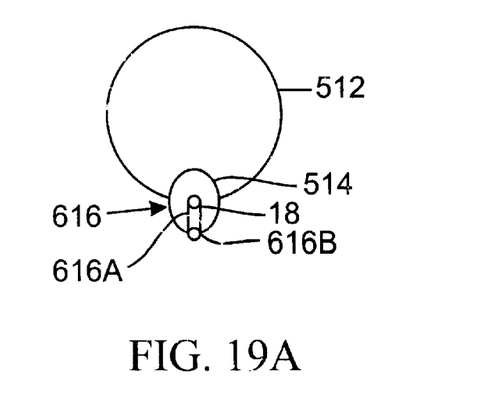
FIG. 19A is a top view of a fifth weight (512), attached to a fishing line (18), having a sixth elastomer (616) contained within the fifth channel (514).

Lastly, referring to FIG. 19 which is a side view of a fifth weight (512), attached to a fishing line (18), having a sixth elastomer (616) contained within the fifth channel (514) and FIG. 19A which is a top view of a fifth weight (512), attached to a fishing line (18), having a sixth elastomer (616) contained within the fifth channel (514). The sixth elastomer (616) comprises a sixth elastomer left side (616A) connected to a sixth elastomer right side (616B) forming a sixth elastomer groove (616C) therebetween. The sixth elastomer groove (616C) functions to frictionally hold the fishing line (18).

The elastomers (116, 216, 316, 416, 516, 616) are manufactured from a stretchable material selected from a group consisting of rubber, rubber composite, plastic and plastic composite.

The weights (112, 212, 312, 412, 512) are manufactured from a material selected from a group consisting of stone, concrete, metal, metal alloy, rubber, and rubber composite.

It will be understood that each of the elements described above, or two or more together, may also find a useful application in other types of constructions differing from the type described above.

While the invention has been illustrated and described as embodied in an environmentally-safe slotted weighting attachment for a fishing line, it is not intended to be limited to the details shown, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

I claim:

1. An environmentally safe fishing weight comprising:
   a weight having a bore therethrough,
   an elastomeric structure removably inserted within the bore, the elastomeric structure has a substantially dumbbell configuration with a first elastomeric top nodule securely stretchably integrally connected to a first elastomeric bottom nodule by a middle portion, the said nodules are of a greater diameter than the said bore, the said middle portion has a length coextensive with the bore, the first elastomeric top nodule has an integral first elastomeric loop whereby a fishing line may be attached.

2. An environmentally safe fishing weight of claim 1 wherein the first bottom nodule has an integral second elastomeric loop whereby a fishing line may be attached.

3. The environmentally safe fishing weight of claim 2, wherein the weight is selected from the group consisting of stone, concrete, non-lead containing metal, rubber and rubber composite.

4. The environmentally safe fishing weight of claim 1 wherein the weight is selected from the group consisting of stone, concrete, non-lead containing metal, rubber and rubber composite.

\* \* \* \* \*